United States Patent [19]

Rymarchyk et al.

[11] 4,211,316
[45] Jul. 8, 1980

[54] CHUTE FOR CHARGING STEEL MAKING VESSELS

[75] Inventors: Nicholas M. Rymarchyk, Wexford, Pa.; Charles T. Smith, New Buffalo, Mich.

[73] Assignee: Pullman Berry Company, Harmony, Pa.

[21] Appl. No.: 973,828

[22] Filed: Dec. 28, 1978

[51] Int. Cl.² ............................................. B65G 11/00
[52] U.S. Cl. .................................... 193/2 R; 165/139; 165/155; 165/160; 266/216; 414/152
[58] Field of Search ...................... 266/270, 225, 216; 193/2 R, DIG. 2; 138/38, 95, 114; 165/139, 155, 160; 222/146 C; 414/150, 152

[56] References Cited

U.S. PATENT DOCUMENTS

| 2,827,279 | 3/1958 | Cox ........................................ 266/270 |
| 3,236,281 | 2/1966 | Bain et al. ............................. 266/189 |
| 3,794,308 | 2/1974 | Ponghis et al. ........................ 266/270 |
| 3,859,040 | 1/1975 | Sheprete et al. ....................... 138/38 |
| 4,106,756 | 8/1978 | Rymarchyk et al. ................. 266/225 |
| 4,113,009 | 9/1978 | Meyer et al. ............................ 138/38 |

FOREIGN PATENT DOCUMENTS

| 2101124 | 3/1972 | France ..................................... 266/270 |
| 1274074 | 5/1972 | United Kingdom ..................... 266/270 |

Primary Examiner—L. Dewayne Rutledge
Assistant Examiner—Michael L. Lewis
Attorney, Agent, or Firm—Stephen D. Geimer

[57] ABSTRACT

A water cooled material additive chute for introducing fluxing material into a furnace including water cooled inlet and outlet chambers meeting at a tip or nose portion, a local coolant water injection pipe extending through one of the chambers and into the tip region to augment the cooling efficiency of the water coolant, and a pipe structure which accommodates thermal expansion.

10 Claims, 7 Drawing Figures

CHUTE FOR CHARGING STEEL MAKING VESSELS

BACKGROUND OF THE INVENTION

1. Field of the Invention

This invention relates to furnace operations and more particularly to an additive chute for introducing fluxing materials or the like into the furnace.

2. Description of the Prior Art

In furnace operations such as used in steelmaking, it has been common to fabricate additive flux chutes which include an internal additive tube surrounded by a larger tube including a water cooling chamber. Typically, the top and nose portions of the chute would include annular plates sealing the ends of concentric water inlet and outlet pipes welded within the arrangement such that cooling water could be moved through the chamber to cool the chute during furnace operations. However, it has been the applicant's experience that heat transfer to the cooling fluids within the chute constructions heretofore known must be very closely monitored and controlled; and further, because of the high temperatures to which the chute must necessarily be subjected, the rigid welded constructions of the prior art have developed leaks or fractures resulting from thermal and mechanical stresses in the welds due to thermal expansion of the various elements of the chute. The present arrangement overcomes these difficulties and, thus, substantially enhances the safe operation, maintainability and service life over the construction of the prior art.

SUMMARY OF THE INVENTION

In the present invention the additive chute design includes an upper tubular portion which receives material such as lime or other fluxes that have to be added to a furnace vessel during its operation. A conventional gate is provided at the top through which material may be delivered to the upper tubular portion of the chute which in turn is connected to a first tubular chute portion and to a second tubular chute portion.

The additive chute includes three removable sections which are readily removed for service. A first chute portion includes a first upper tube or pipe assembly including a first upper outer pipe and a first inner pipe spaced radially therefrom to provide a water inlet chamber and communication with a water inlet pipe. The lower end of the first pipe assembly includes a flange which is adapted to be easily connected and disconnected to a second lower flange of the second lower pipe assembly comprising the second chute portion. The second lower tube pipe assembly comprises an outer tube and an inner tube or pipe separated by means of an intermediate pipe which divides the space between the lower pipes into a water chamber in communication with the upper water chamber and a water outlet chamber which is suitably connected to a water outlet pipe. The flange connection of the upper and lower chute portions has positioned therebetween in clamping relation an intermediate flange which is sealingly connected between the upper flanges and lower flanges of the respective first and second tube portions. The intermediate flange also provides the closure or isolating means for separating the water discharge chamber at its upper end from the water inlet chamber.

The chute also includes a localized tip coolant pipe extending from the upper pipe assembly and opening into the tip or nose portion of the lower pipe assembly so as to promote high velocity flow and turbulence in the tip, thus further enhancing cooling of the tip. The tip coolant pipe is suitably connected to an auxiliary water inlet pipe and is mounted within the upper and lower pipe assemblies so as to effectively accommodate longitudinal expansion and contraction of the chute members during use.

DESCRIPTION OF THE PREFERRED EMBODIMENT

Figure 1:
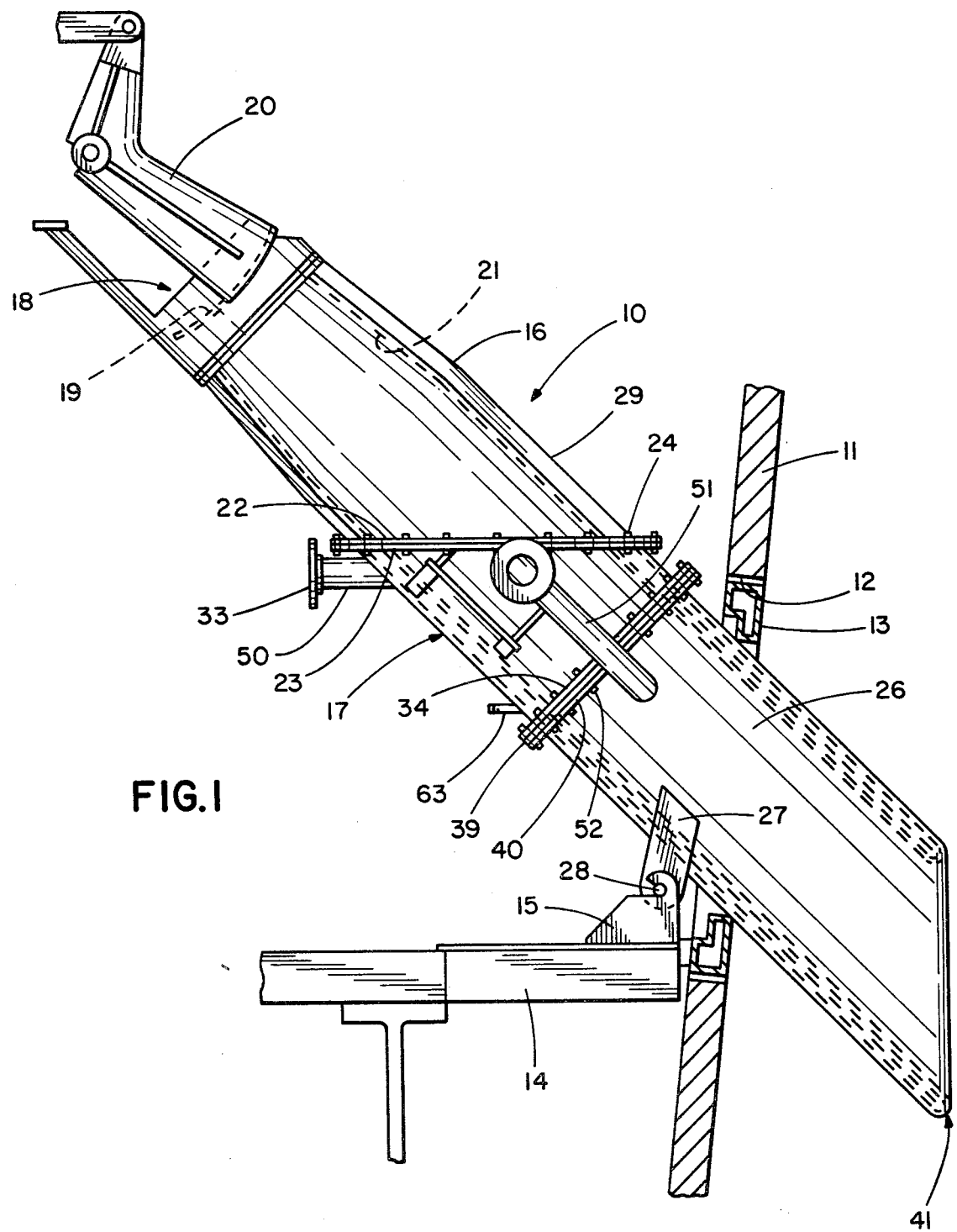
FIG. 1 is a side elevational view of an additive chute supported in charging relation relative to a wall portion of a steelmaking vessel.

As particularly shown in FIG. 1 a furnace and additive charging chute 10 is shown in charging relation projecting through the wall 11 of a steelmaking vessel in opening 12 supporting an additive chute adaptor panel 13 through which the chute 10 projects. The charging chute 10 includes an upper first chute portion 16 and a lower second chute portion 17. The upper end of the chute 10 is provided with a conventional charging opening 18 adapted to be controlled by a hinged gate 19 by gate opening and closing mechanism 20 in conventional matter. The first chute portion 16 includes a tubular inner wall 21 provided at its lower end with a flange 22 connected to a flange 23 by quick disconnect bolts and nuts 24. The flange 23 is connected to the upper end of a first upper pipe assembly 25 which is connected as will be described to a second lower pipe 26. As best shown in FIG. 1 a floor ramp 14 is provided with hinge brackets 15 which hingedly support hinge brackets 27 including hinge pins 28 whereby the additive chute may be raised and lowered as desired for removal.

Figure 2:
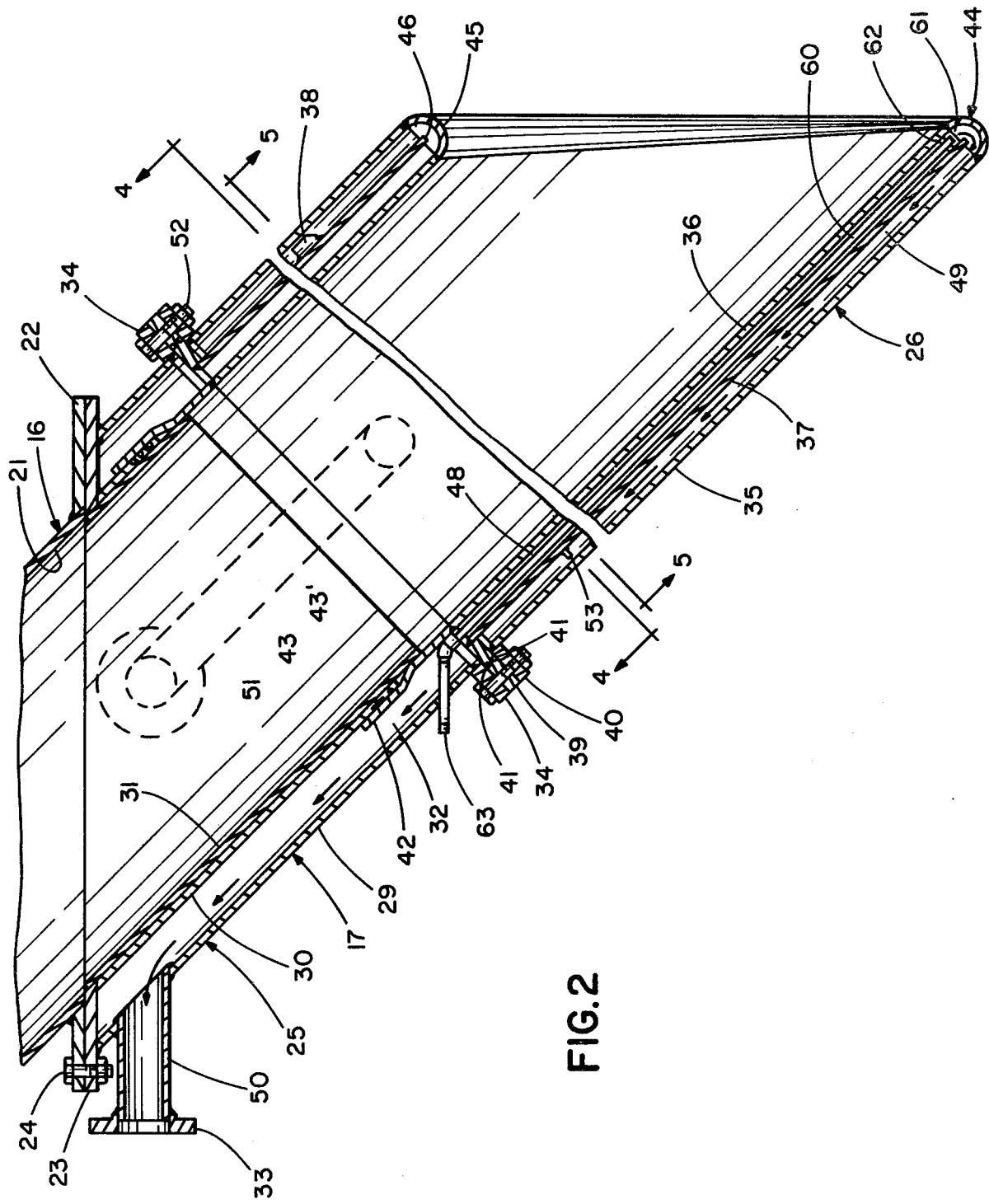
FIG. 2 is a cross-sectional view through a portion of an additive chute shown in FIG. 1.
Figure 3:
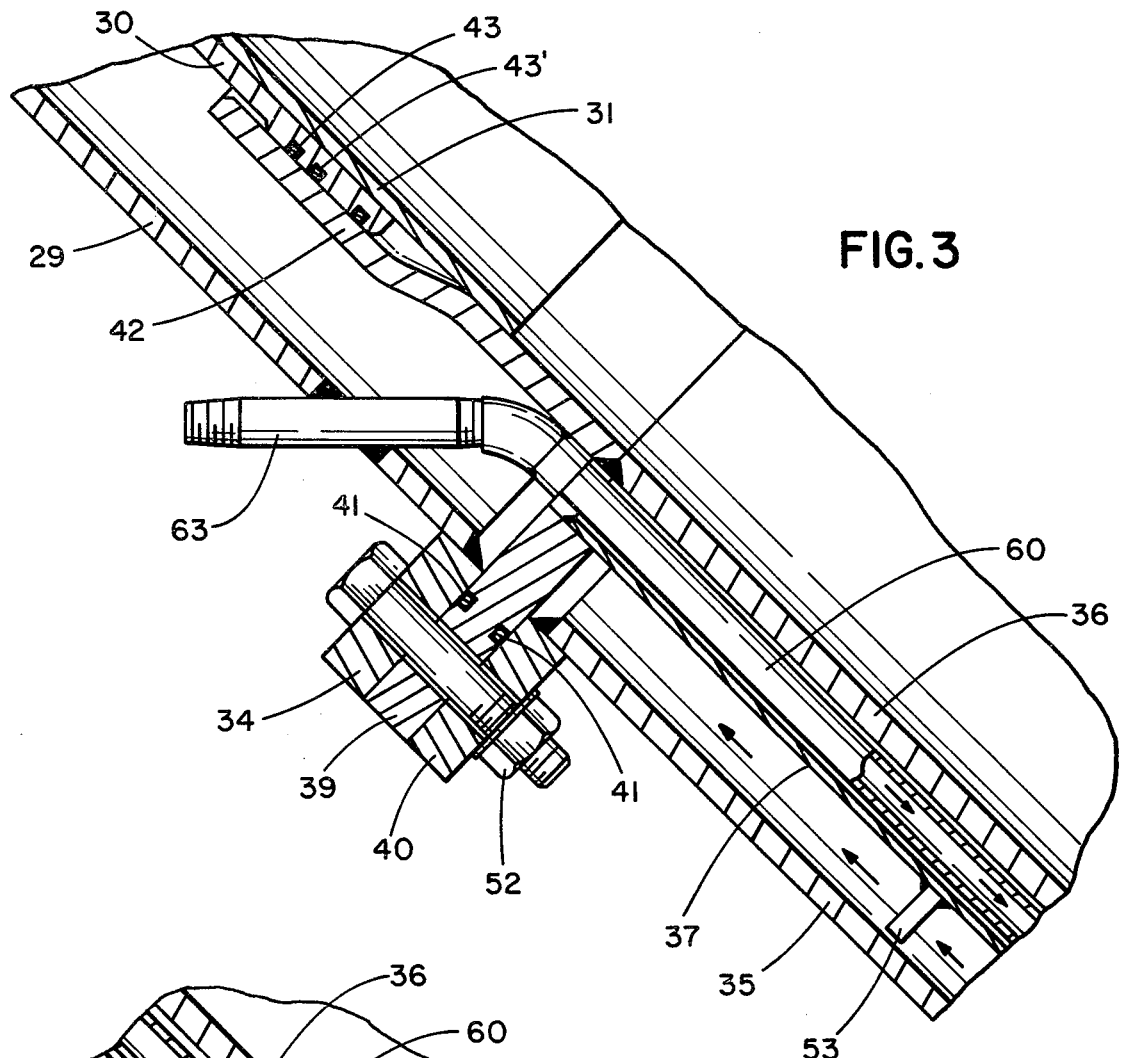
FIG. 3 is an enlarged cross-sectional view of a portion of the chute showing the connection between upper and lower chute portions and the tip coolant pipe.
Figure 5:
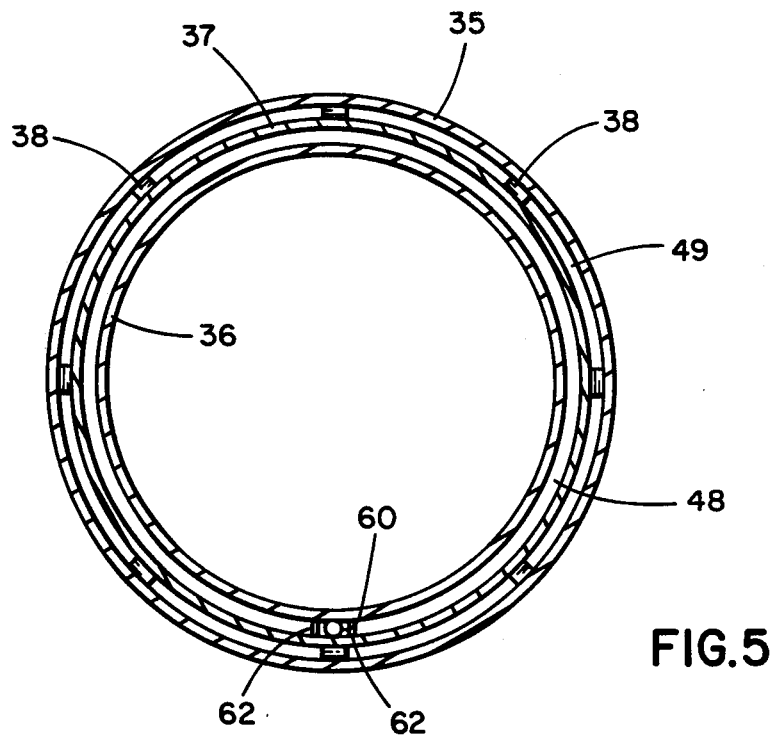
FIG. 5 is a cross-sectional view taken substantially along lines 5—5 of FIG. 2.

The first upper pipe assembly 25 includes a first upper pipe 29 and a second upper pipe 30 spaced radially inwardly from the first upper pipe to provide a space therebetween which comprises an upper water chamber 32. An inner sleeve 31 as best shown in FIG. 2 is rigidly secured to the pipe 30 and projects slightly below the lower end thereof. A water inlet pipe 50 including connection 33 projects outwardly from the first upper pipe for supplying water to the upper water inlet chamber 32. The first upper pipe 29 is provided in its lower end with a lower flange 34. The second lower pipe assembly 26 includes a first lower pipe 35 and a second lower pipe 36 spaced radially inwardly therefrom. An intermediate pipe 37 is spaced substantially radially midway between the pipes 35 and 36 and includes a plurality of spacers 38 positioned about the periphery of the pipe 37 as shown in FIG. 5. An intermediate flange 39 is connected to the upper ends of the pipes 35 and 37. A plurality of seals 41, as best shown in FIG. 3, are disposed on suitable grooves for effectively sealing the flanged connection by means of quickly removable bolt and nut connections. The pipe 36 is provided at its upper end with an extension 42 which is in an overlapping relation with respect to a lower end piston portion 32' of the pipe 30. The piston portion 32' comprises a plurality of annular grooves 43' within which O-rings 43 are provided. As shown in the drawings, the lower end of the liner pipe 31 projects downwardly beyond the piston portion 32' in overlapping relation with respect to the lower portion of the extension 42.

The tip of the chute is generally designated at 44 and includes an arcuate wall 45 which extends in oblique relationship with respect to a vertical plane through the chute. The intermediate wall 37 projects downwardly in spaced relation as indicated at 46 to end shortly above the arcuate wall of the tip 44. The intermediate wall 37 provides with the wall 36 a lower inlet water chamber 48 and a water discharge chamber 49 which discharges cooling water through an outlet pipe 51. Two of such pipes are shown but if it is desired one may be capped and the other may be utilized. Additionally, to adjust and direct the flow of coolant water through the discharge chamber 49, spaced baffles 53 defining an opening 54 are provided which in turn promote circulation in the interior of the tip.

Figure 6:
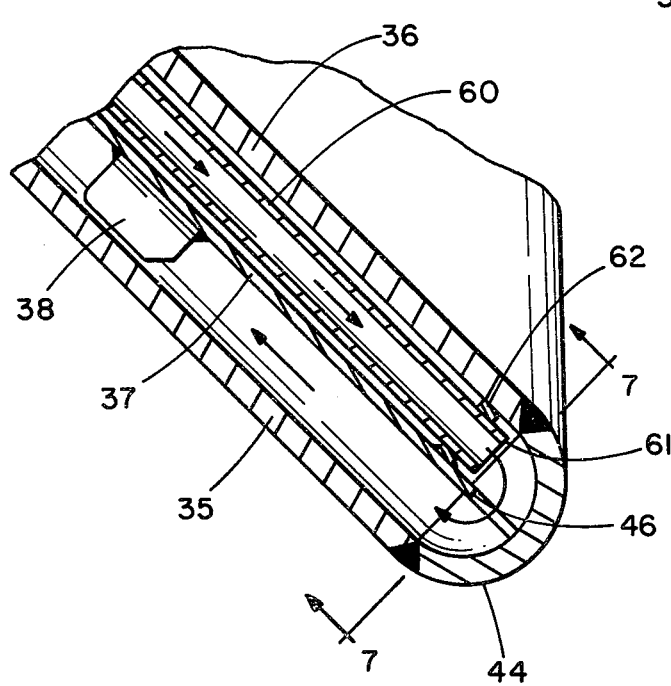
FIG. 6 is an enlarged cross-sectional view of the lower portion of the chute showing the interior of the tip and the tip coolant pipe outlet.
Figure 7:
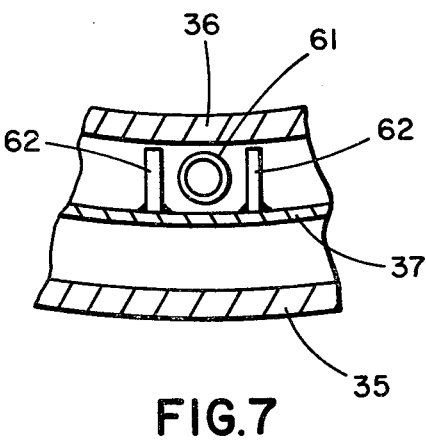
FIG. 7 is a cross-sectional view taken substantially along lines 7—7 of FIG. 6.
Figure 4:
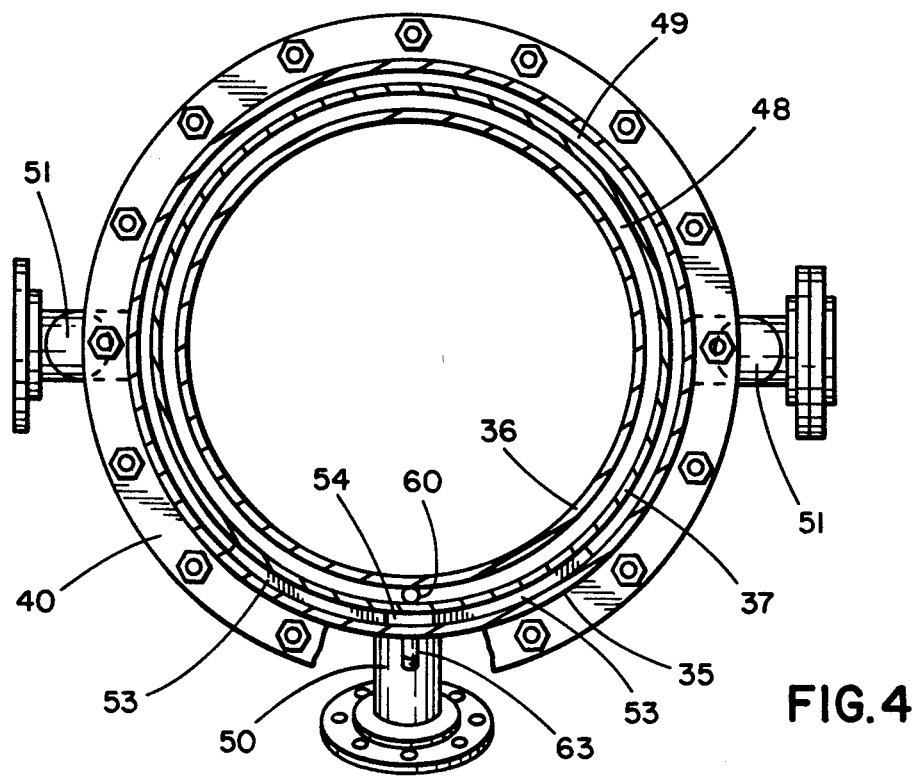
FIG. 4 is a cross-sectional view taken substantially along lines 4—4 of FIG. 1.

To enhance and thus assure cooling of the lower region of the tip, the invention includes a tip coolant pipe 60 extending from the upper pipe assembly 25 and opening into the interior of the tip. The pipe 60 is positioned between the pipes 36 and 37 and extends into the interior of the tip as best shown in FIGS. 6 and 7. The lower end 61 of the tip pipe is slidingly captive between and retained by a pair of spaced lugs 62 suitably secured to the intermediate pipe 37 and in generally abutting slip joint relation with the pipe 35 to accommodate relative thermal expansion and contraction of the pipes. The upper end of the tip coolant pipe extends into the inlet chamber 32 and is suitably connected to and supported by the upper water inlet connection pipe 63 extending through the pipe 29 and suitably connected thereto by welding or the like as best shown in FIG. 3.

OPERATION

FIG. 1 discloses the additive chute in position for charging lime or other fluxes and materials into the furnace as desired. The loading is conventional and material fed into the chute is directed immediately downwardly therethrough into the furnace. In the event that the chute has to be repaired it can be lowered from the position shown in FIG. 1 on to the ramp 14 and thereupon removed from the site for suitable repairs as necessary. The present chute is easily repaired since it can readily be disassembled by the quick disconnect bolt arrangement provided by the flanged connections 22, 23, 34, 39 and 40.

In operation, water is fed into the water inlet chamber 32 through the inlet pipe 50 where it is directed into the chamber 48 and around the lower end 46 of the intermediate wall and through the water outlet chamber 49 to the discharge pipes 51. The intermediate flange 39 serves to divert the water into the chamber 48 and isolates the chamber 49 from which the water is discharged so that a continual water flow is maintained. Simultaneously, cooling water is also injected directly into the interior of the tip through the tip pipe 60 which opens and is in communication with what experience has shown to be the hottest region within the tip and wherein accumulations of sediment from the cooling water tend to develop which in turn reduce heat transfer and thus cooling of the tip.

By injecting water directly into the hottest region of the tip, the invention provides for a scrubbing-like flow within the tip whereby sediment is constantly carried away from the tip region and out of the chute by the circulating coolant. Moreover, since the injected coolant generates turbulence in the main stream of coolant flowing through the tip region, the invention further enhances cooling in the tip.

From the above, it can be seen that the invention substantially abates the development of thermally induced fracturing stresses resulting from overheating due to coolant cavitation, encrustations of sediment, and dead water zones within the chute as well as accommodating relative thermal expansion and contraction of the chute members.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A chute for conveying materials into a vessel containing a molten bath including a first tubular chute portion having a material receiving opening, the improvement of a liquid cooled second chute communicating with said first chute comprising,
   a first upper pipe assembly including first and second concentric upper pipes,
   said second concentric upper pipe being positioned within said first upper pipe and providing an annular first water inlet chamber,
   water inlet connection for said first inlet chamber,
   a second lower pipe assembly including first, second and third concentric lower pipes,
   said second lower pipe being positioned within said first lower pipe and said third lower pipe being positioned intermediate said first and second lower pipes and providing with said second lower pipe a second water inlet chamber communicating with said first water inlet chamber and providing with said first lower pipe a water outlet chamber isolated at its upper ends from said water inlet chamber,
   an annular tip portion connected to the lower ends of said first and second lower pipes,
   said intermediate third pipe having a lower portion thereat spaced from said tip providing communication between said second water inlet chamber and said water outlet chamber and providing a tip coolant chamber proximate to the tip,
   a tip coolant injection pipe positioned between said first and second pipes, said injection pipe having an upper water inlet connection and a lower outlet end portion opening to said tip coolant chamber,
   a water outlet connection connected to said water outlet chamber, and
   coupling means releasably connecting said first and second pipe assemblies.

2. The invention according to claim 1, wherein said upper water inlet connection is connected to said first upper pipe assembly.
3. The invention according to claim 1, wherein
said tip coolant injection pipe is positioned between said second and third lower pipes.
4. The invention according to claim 1, wherein
said annular tip is disposed in oblique relation relative to a vertical plane disposed on the axis of the tubular chute, and
said lower outlet end portion opening to the lowermost region of said tip coolant chamber.
5. The invention according to claim 1, which includes
retaining means securing said lower outlet end portion to said intermediate pipe in sliding slip joint relation.
6. The invention according to claim 1, wherein
said upper water inlet connection is rigidly connected to said first upper pipe assembly, and
retaining means coupling said lower outlet end portion to said second lower pipe assembly in sliding slip joint relation.
7. The invention according to claim 1, wherein
said coupling means includes an annular flange isolating said outlet chamber from said first water inlet chamber.
8. The invention according to claim 1, wherein
said annular tip has an arcuate wall portion connecting the lower portions of said first and second lower pipes.
9. The invention according to claim 1, wherein
said second upper and lower pipes are positioned in overlapping slip joint relation.
10. The invention according to claim 9, wherein
said overlapping pipes have sealing means disposed therebetween.

* * * * *